United States Patent [19]

Boutni

[11] Patent Number: 5,023,297
[45] Date of Patent: Jun. 11, 1991

[54] IMPACT AND SOLVENT RESISTANT POLYCARBONATE COMPOSITION

[75] Inventor: Omar M. Boutni, Mt. Vernon, Ind.

[73] Assignee: General Electric Company, Mt. Vernon, Ind.

[21] Appl. No.: 455,066

[22] Filed: Dec. 22, 1989

[51] Int. Cl.$^5$ .............................................. C08L 69/00
[52] U.S. Cl. ...................................... 525/67; 525/89; 525/92
[58] Field of Search ............................ 525/67, 89, 92

[56] References Cited

U.S. PATENT DOCUMENTS

| | | | |
|---|---|---|---|
| 4,628,072 | 12/1986 | Shiraki | 525/92 |
| 4,743,650 | 5/1988 | Boutni | 525/92 |
| 4,788,252 | 11/1988 | de Boer | 525/67 |

*Primary Examiner*—John C. Bleutge
*Assistant Examiner*—David Buttner
*Attorney, Agent, or Firm*—Martin B. Barancik

[57] ABSTRACT

A composition comprising an admixture of
  a. a major quantity of an aromatic polycarbonate and
  b. a minor quantity of
    i. a polycarbonate polysiloxane block copolymer; and
    ii. a hydrogenated alkylidene vinyl aromatic block copolymer graft modified with an unsaturated dicarboxylic acid or unsaturated dicarboxylic acid anhydride, wherein the quantities of b are such that the ¼ inch impact resistance of a molded part and the organic solvent resistance is improved over polycarbonate alone while maintaining the compatibility of the composition of a and b.

12 Claims, No Drawings

IMPACT AND SOLVENT RESISTANT POLYCARBONATE COMPOSITION

BACKGROUND OF THE INVENTION

Polycarbonates are well known as tough highly impact resistant polymers. However as an amorphous material, above a certain critical thickness the polycarbonate loses its impact strength and becomes rather weak and brittle. This critical thickness lies between ⅛ inch and ¼ inch. Molded parts of ⅛ inch thickness are highly resistant to impact in a notched test while molded parts of ¼ inch thickness are above the critical thickness and demonstrate poor notch impact results as well as brittleness. Additionally polycarbonates are quite sensitive to certain environmental stresses such as organic solvents.

Many blends of polycarbonate with other polymers have been developed in an attempt to improve these properties in polycarbonate. Some of these blends have met with significant degree of success. However these admixtures can create new problems. In order for an admixture to be successful, the composition must be compatible. The admixture components should mix and maintain the blend integrity upon molding. This is evidenced by little or no delamination in the molded part and an impact resistant, ductile knit line when a molded part is formed in a mold having two ports of entry for the thermoplastic admixture (double gate test system).

A new polycarbonate composition has been discovered which combines substantially improved impact resistance in thick section with improved organic solvent resistance while demonstrating good compatibility.

SUMMARY OF THE INVENTION

In accordance with the invention, there is a composition comprising an admixture of
  a. a major quantity of an aromatic polycarbonate and
  b. a minor quantity of
    i. a polycarbonate polysiloxane block copolymer; and
    ii. a hydrogenated alkylidene vinyl aromatic block copolymer graft modified with an unsaturated dicarboxylic acid or unsaturated dicarboxylic acid anhydride,
wherein the quantities of b are such that the ¼ inch impact resistance of a molded part and the organic solvent resistance is improved over polycarbonate alone while maintaining the compatibility of the composition of a and b.

A further aspect of the invention is a composition comprising an admixture of
  a. about 80-94 wt. percent of an aromatic polycarbonate,
  b. about 3 to 10 wt. percent of block copolymer of polycarbonate and polysiloxane, and
  c. about 3 to 10 wt. percent of a hydrogenated alkylidene vinyl aromatic block copolymer graft modified with an unsaturated dicarboxylic acid or unsaturated dicarboxylic acid anhydride.

DETAILED DESCRIPTION OF THE INVENTION

The aromatic polycarbonate useful herein can generally be prepared by the reaction of at least one dihydric phenol and a carbonate precursor such as phosgene, a haloformate, or a carbonate ester. Generally speaking, such polycarbonate resins may be typified as being comprised of at least one recurring structural unit represented by the formula

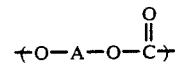

wherein A is a divalent aromatic residue of the dihydric phenol employed in the polymer forming reaction. Preferably, the polycarbonate polymers used to provide the articles of the instant invention have an intrinsic viscosity (as measured in methylene chloride at 25° C.) ranging from about 0.3 to about 1.7 dl/gm. The dihydric phenols which may be employed to provide such aromatic carbonate polymers may be represented by the general formula

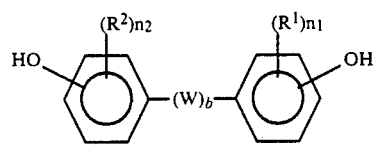

wherein:
  $R^2$ is independently selected from halogen, monovalent hydrocarbon, monovalent hydrocarbonoxy, and monovalent hydrocarboncarboxy radicals.
  $R^1$ is independently selected from halogen, monovalent hydrocarbon, and monovalent hydrocarbonoxy and hydrocarboncarboxy radicals;
  W is selected from divalent hydrocarbon radicals,

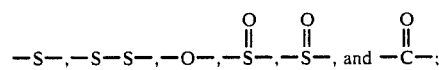

$n^2$ and $n^1$ are independently selected from integers having a value from 0 to 4 inclusive; and
  b is either zero or one.

The monovalent hydrocarbon radicals represented by $R^2$ and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by $R^2$ and $R^1$ are chlorine and bromine.

The divalent hydrocarbon radicals represented by W include the alkylene, alkylidene, cycloalkylene, and cycloalkylidene radicals. The preferred alkylene radicals are those which contain from 2 to about 30 carbon atoms. The preferred alkylidene radicals are those containing from 1 to about 20 carbon atoms. The preferred cycloalkylene and cycloalkylidene radicals are those containing from 6 to about 12 ring carbon atoms.

The monovalent hydrocarbonoxy radicals represented by $R^2$ and $R^1$ may be represented by the formula —$OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals.

The monovalent hydrocarboncarboxy radicals represented by $R^2$ and $R^1$ may be represented by the formula

where $R^3$ is as described above. Preferred monovalent hydrocarboncarboxy radicals are acetoxy and benzoyl radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-dihydroxydiphenyl ether;
4,4'-thiodiphenol;
4,4'-dihydroxy-3,3'-dichlorophenyl ether; and
4,4'-dihydroxy-2,5-dimethyldiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transterification processes such as disclosed in U.S. Pat. No. 3,153,008, incorporated by reference, as well as other processes known to those skilled in the art.

It is possible to employ two or more different dihydric phenols or a copolymer of a dihydric phenol with glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl)propane (bisphenol-A).

The second component of the composition is a block copolymer of a vinyl aromatic and an aliphatic diene which has been hydrogenated to remove a substantial quantity of the residue aliphatic unsaturation present after copolymerization, the block copolymer grafted with an unsaturated dicarboxylic acid or acid anhydride molecule. The block copolymers are of the linear, sequential or radial teleblock composition. These polymers are well known in the art and are generally commercially available or may be readily prepared by known methods.

One of the blocks of these polymers comprise homopolymers or copolymers prepared from vinylaromatic hydrocarbons wherein the aromatic moiety can be either monocyclic or polycyclic. Typical monomers include styrene, alpha-methyl styrene, p-methyl styrene, vinyl xylene, ethyl vinyl xylene, vinyl naphthylene, and the like, or mixtures thereof. Assuming more than one block of vinylaromatic the blocks may be the same or different. They are preferably selected from styrene, alpha-methyl styrene, vinyl toluene, vinyl xylene, vinyl naphthylene, and especially styrene. The block of aliphatic diene may be derived from, for example, butadiene, isoprene, 1,3-pentadiene, 2,3-dimethylbutadiene, and the like, and it may have a linear, sequential or teleradial structure. As generally prepared, the aliphatic diene block of the polymer will have residual unsaturation present. Examples of such commercially available polymers are the KRO3 series available from Phillips, Stereon 840A available from Firestone and Kraton D available from Shell Chemical. For purposes of this invention, essentially all this residual unsaturation can undergo selective hydrogenation procedures whereby essentially all the unsaturation in the vinylaromatic block(s) is maintained. The selectively hydrogenated linear block copolymers are described in Haefel, et al., U.S. Pat. No. 3,333,024, which is incorporated herein by reference. These selectively hydrogenated copolymers are commercially available from Shell as the Kraton G series such as Kraton G1650, Kraton G1651 and Kraton G1652.

The copolymers can be random blocks, diblock, or triblock. An example of a commercially available random block is Stereon 840A, a copolymer of styrene and butadiene. An example of a diblock copolymer is Solprene, available from Phillips, a diblock of styrene and butadiene. Examples of triblock copolymer, such as styrene-butadiene-styrene are the Phillips KR03 line and the Shell Kraton G and Kraton D lines, wherein the residual unsaturation of the aliphatic diene has been essentially removed by selective hydrogenation in the Kraton G series.

The ratio of the copolymers in the triblock copolymer and the average molecular weights can vary broadly in the triblock copolymer, although the molecular weight of the aliphatic diene block should be greater than that of the combined terminal blocks. It is preferred to form the terminal block each having a weight average molecular weight of about 2,000 to about 60,000 and center block, e.g. a hydrogenated or (non-hydrogenated polybutadiene) block, with a weight average molecular weight of about 20,000 to 450,000. Still more preferably, the terminal blocks each have a weight average molecular weight of about 7,000 to about 35,000 while the hydrogenated (or non-hydrogenated polybutadiene) polymer blocks have a weight average molecular weight between about 30,000 and 150,000. The terminal blocks will preferably comprise from about 10 to about 45% by weight, more preferably from about 14 to about 40% by weight of the total block copolymer. The preferred copolymers will be those having a polybutadiene center block wherein from about 35 to about 55% of the butadiene block segment is the structure resulting from 1,2 addition.

The hydrogenated copolymer will have the average aliphatic unsaturation reduced to less than 20% of the original value. It is preferred to have the unsaturation reduced to 10%, or less, preferably 5%, or less, of its original value. After hydrogenation center blocks derived from butadiene will have the ethylene butylene structure.

The block copolymers are formed by techniques well known to those skilled in the art. Hydrogenation may be conducted utilizing a variety of known hydrogenation catalysts such as nickel on kieselghur, Raney nickel, copper chromate, molybdenum sulfide and finely divided platinum or other noble metals on a high surface area carrier.

Hydrogenation may be conducted at any desired temperature or pressure, e.g., from atmospheric to about 210 Kg/cm$^2$. The usual range being between 7 and 70 Kg/cm$^2$ at temperatures from 24° C. to 316° C. for times between 0.1 and 24 hours, preferably from 0.2 to 8 hours.

Hydrogenated block copolymers such as Kraton G-1650, Kraton G-1651 and Kraton G-1652 from Shell Chemical Company, Polymers Division, have been found useful in the present invention. Also useful are the Solprenes of Phillips.

The hydrogenated versions of radial teleblock copolymers of which the Solprenes are typical examples can be characterized as having at least three polymer branches with each branch of the radial block polymer comprising terminal non-elastomeric segments, as defined hereinafore. The branches of the radial block polymer contain a terminal non-elastomeric segment attached to an elastomeric polymer segment, as defined hereinafore. These are described in Marrs, U.S. Pat. No. 3,735,936 and in Zelinski, U.S. Pat. 3,281,383, both of which are incorporated herein by reference, and they are selectively hydrogenated by well known procedures. In any event, the term "selective hydrogenation" is used herein to contemplate polymers in which the aromatic blocks have been left essentially unhydrogenated.

The molecular weight of the triblock copolymer should be selected so that the tie layer will be easily processed together with the polycarbonate and the polyolefins. Kraton G-1652 is therefore preferred over Kraton G-1651, both available from Shell since the higher molecular weight of 1651 makes it more difficult to extrude.

A hydrogenated version of a diblock copolymer such as Stereon 840A or Kraton D 1720 can also be employed in the invention. Generally the vinylaromatic portion is from about 20 to 40 weight percent of the polymer, the remainder of the polymeric unit being the aliphatic diene. The random block copolymer such as Stereon 840A is made up of various unit blocks of varying length. Although referred to generally as a random block copolymer, Stereon 840A may be tapered as well, that is a block of styrene followed by a block of butadiene followed by a shorter block of styrene than the first block which is followed by a shorter block of butadiene than the first block followed by a still shorter block of styrene, etc. The quantity of vinylaromatic such as styrene is generally from about 20 to about 50 weight percent. In Stereon 840A, the weight percent of styrene is 43%.

After preparation of the hydrogenated block copolymer of the vinyl aromatic and aliphatic diene, the unsaturated dicarboxylic acid or acid anhydride is then grafted onto the hydrogenated block copolymer. No aliphatic double bond is needed to permit the grafting to occurr. Rather the grafting occurs on the saturated aliphatic portion. The techniques disclosed in European Patent application publication number 173380 Gelles, et al, assigned to Shell Internationale Research Maatschappij B. B. and incorporated by reference, prepare the grafted block copolymer. Specifically the synthetic procedure as illustrated at 173380, page 6, line 23 and page 9, line 30 to page 13, line 31 are all incorporated by reference. This type of reaction will result in the addition of the unsaturated dicarboxylic acid or acid anhydride at a secondary or tertiary carbon atom of the block copolymer therefore resulting in the loss of the unsaturation in the grafting agent.

The grafting agent as previously mentioned is an unsaturated dicarboxylic acid or acid anhydride. Generally these acids or diacid anhydrides are of the group consisting of

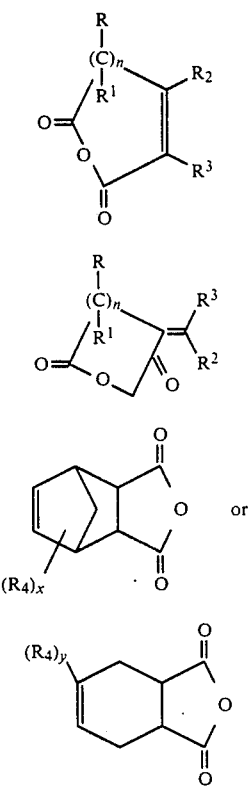

or the dicarboxylic acid analogues thereof
  wherein R is the same or different as R$_1$ and is alkyl of one to six carbon atoms, inclusive, or hydrogen;
  R$_2$ and R$_3$ are the same or different and are hydrogen, alkyl of one to six carbon atoms, inclusive, phenyl, chloro or bromo; and n is 0, 1 or 2.
  R$_4$=H, alkyl of one to six carbon atoms, aryl, alkyl, phenyl, Br, Cl, X=0 to 7, preferably 0, 1 or 2, y=0 to 6.

The preferred alkyl groups have no more than three carbon atoms. R and R$_1$ are each preferably hydrogen and n is preferably zero or 1, x and y are preferably 0 or 1. Examples of the acid anhydrides and the diacid analogue thereof are maleic anhydride, itaconic anhydride, methyl maleic anhydride, monochloro maleic anhydride, dichloro maleic anhydride, dimethyl maleic anhydride, norbornene dicarboxylic anhydride, tetrahydrophthalic anhydride.

The graft modification can vary from about 0.1 to 2.0 wt. percent of the block copolymer.

The polycarbonate polydiorganosiloxane block copolymers useful in this composition are included in the disclosure of U.S. Pat. No. 3,189,662, issued to Vaughn and assigned to General Electric Company. This patent is incorporated by reference in its entirety. The block copolymers have been utilized in various applications as observed in U.S. Pat. Nos. 4,027,072 and 4,123,588, issued to Molari and assigned to General Electric Company. Both of these U.S. patents are incorporated by reference into the application. Additionally, the disclosure of U.S. Pat. No. 4,735,999 is incorporated by reference thereto.

The polysiloxane polycarbonate block copolymer can vary from about three to ten weight percent of the polycarbonate, graft modified polymer and polysiloxane polycarbonate copolymer. Preferably, the quantity is from about four to eight weight percent. The graft modified hydrogenated alkylidene vinyl aromatic block copolymer can vary from about 3 to 10 weight percent, preferably about 4 to 8. The polycarbonate is from about eighty to ninety four weight percent of the polymeric composition, preferably eighty four to ninety two weight percent.

The admixtures of the invention are prepared by dry blending in a Banbury mixture the component polymers and any stabilizers followed by extruding and molding at conventional temperatures.

The experiments below are used to illustrate the invention and are not intended to limit the inventive scope and concept.

EXAMPLES

In the examples below, the polycarbonate (PC) is bisphenol-A polycarbonate with an intrinsic viscosity of about 0.50–0.52 in methylene chloride at 25° C. 0.03 wt. % of a phosphite is present in the PC.

KRATON FG1901X is 1.2 wt. % maleic anhydride graft modified styrene ethylene butylene styrene block copolymer available from Shell.

LR is a dimethyl polysiloxane bisphenol-A polycarbonate block copolymer having 43 weight percent siloxane therein with the siloxane block 10 units in length.

The polymeric components were dry mixed, extruded at 500° F. and molded into test pieces at 570° F.

The Notched Izod impact tests and double gate test were performed according to ASTM D256.

In order to test resistance against organic solvents, an Izod bar was mounted on a stress jig under 3400 psi of stress, soaked two hours in unleaded Amoco gasoline, removed air dried for 24 hours and then impact tested. Below are the results.

TABLE

| Composition | | | | | |
|---|---|---|---|---|---|
| PC | 95 | 90 | 85 | 95 | 90 |
| FG1901X | 5 | 10 | 15 | — | 5 |
| LR | — | — | — | 5 | 5 |
| Properties | | | | | |
| ⅛ in Notch Izod J/M | 801 | 748 | 849 | 801 | 838 |
| ⅛ in Notch Izod J/M (organic solvent soaked) | 59 | 854 | 908 | 85 | 635 |
| ⅛ in Notch Izod J/M | 721 | 630 | 523 | 748 | 651 |
| Double Gate | 49 | 12 | 5 | 526 | 132 |
| Kg · cm % ductility | 0 | 0 | 0 | 100 | 100 |

As is readily observed from the data, the only composition which provides a combination of good resistance to organic solvent, and good compatibility as shown by the ductile break accompanying good resistance to impact while still maintaining high resistance to notch impact is the composition of the invention.

What is claimed:

1. A composition comprising an admixture of
   a. a major quantity of an aromatic polycarbonate and
   b. a minor quantity of
      i. a polycarbonate polysiloxane block copolymer; and
      ii. a hydrogenated alkylidene vinyl aromatic block copolymer graft modified with an unsaturated dicarboxylic acid or unsaturated dicarboxylic acid anhydride,
   wherein the quantities of b are such that the ⅛ inch impact resistance of a molded part and the organic solvent resistance is improved over polycarbonate alone while maintaining the compatibility of the composition of a and b.

2. A composition comprising an admixture of
   a. 80–94 wt. % of an aromatic polycarbonate,
   a. about 3 to 10 wt. % of block copolymer of polycarbonate and polysiloxane, and
   b. about 3 to 10 wt. % of block copolymer of polycarbonate and polysiloxane, and
   c. about 3 to 10 wt. % of a hydrogenated alkylidene vinyl aromatic block copolymer graft modified with an unsaturated dicarboxylic acid or unsaturated dicarboxylic acid anhydride.

3. The composition in accordance with claim 2 wherein the polysiloxane is a dimethyl siloxane and the hydrogenated alkylidene is ethylenebutylene and the vinyl aromatic is styrene.

4. The composition in accordance with claim 2 wherein the quantity of b is from about 4 to 8 wt. % and the quantity c is from about 4 to 8 wt. %.

5. The composition in accordance with claim 3 wherein b is from about 4 to 8 wt. % and c is from about 4 to 8 wt. %.

6. The composition in accordance with claim 1 wherein the aromatic polycarbonate is bisphenol-A polycarbonate.

7. The composition in accordance with claim 2 wherein the aromatic polycarbonate is bisphenol-A polycarbonate.

8. The composition in accordance with claim 3 wherein the aromatic polycarbonate is bisphenol-A polycarbonate.

9. The composition in accordance with claim 4 wherein the aromatic polycarbonate is bisphenol-A polycarbonate.

10. The composition in accordance with claim 5 wherein the aromatic polycarbonate is bisphenol-A polycarbonate.

11. The composition in accordance with claim 2 wherein the polycarbonate of b is bisphenol-A polycarbonate.

12. The composition in accordance with claim 3 wherein the polycarbonate of b is bisphenol-A polycarbonate.

* * * * *

UNITED STATES PATENT AND TRADEMARK OFFICE
CERTIFICATE OF CORRECTION

PATENT NO. : 5,023,297
DATED : June 11, 1991
INVENTOR(S) : Omar Mohamed Boutni

It is certified that error appears in the above-identified patent and that said Letters Patent is hereby corrected as shown below:

Column 5, line 24, delete "polymers" (2nd occurrence).

Column 8, line 28, after "a" insert "about".

Column 8, delete lines, 28 and 30.

Signed and Sealed this

Tenth Day of November, 1992

Attest:

DOUGLAS B. COMER

*Attesting Officer*          *Acting Commissioner of Patents and Trademarks*